United States Patent [19]

Hall et al.

[11] Patent Number: 4,778,251

[45] Date of Patent: Oct. 18, 1988

[54] THICKNESS ERROR COMPENSATION FOR DIGITAL GRADIENT-INDEX OPTICAL COATINGS

[75] Inventors: Randolph L. Hall, Newbury Park; William H. Southwell, Thousand Oaks, both of Calif.

[73] Assignee: Rockwell International Corporation, El Segundo, Calif.

[21] Appl. No.: 23,587

[22] Filed: Mar. 9, 1987

[51] Int. Cl.$^4$ ............................................. G02B 1/10
[52] U.S. Cl. .................................... 350/166; 350/164; 427/166
[58] Field of Search ................. 350/166, 164; 427/166; 356/381

[56] References Cited

U.S. PATENT DOCUMENTS

| | | | |
|---|---|---|---|
| 2,338,234 | 1/1944 | Dimmick | 427/166 |
| 3,781,090 | 12/1973 | Sumita | 350/166 |
| 4,405,989 | 9/1983 | Tsukada et al. | 356/381 |
| 4,583,822 | 4/1986 | Southwell | 350/164 |
| 4,623,254 | 11/1986 | Imose | 356/381 |
| 4,666,250 | 5/1987 | Southwell | 350/166 |

OTHER PUBLICATIONS

Berning, Use of Equivalent Films in the Design of Infrared Multilayer Antireflection Coatings, Journal of the Optical Society of America, vol. 52, p. 431(1962).
Budde, Photoelectric Analysis of Polarized Light, Applied Optics, vol. 1, p. 201 (1962).
Dobrowolski, Completely Automatic Synthesis of Optical Thin Film Systems, Applied Optics, vol. 4, p. 937 (1965).
Epstein, The Design of Optical Filters, Journal of the Optical Society of America, vol. 42, p. 806 (1952).
Hauge, et al., Design and Operation of ETA, an Automated Ellipsometer, IBM Journal of Research & Development, p. 472, (Nov. 1973).
Hottier, et al., In Situ Monitoring by Ellipsometry of Metalorganic Epitaxy of GaAlAs-GaAs Superlattice, J. of Applied Physics, vol. 51, p. 1599 (Mar. 1980).
Minot, Single-layer, Graded Refractive Index Antireflection Films Effective from 0.35 to 2.5 u, J. of Optical Society of America, vol. 66, p. 515 (1976).
Netterfield, et al., Characterization of Growing Thin Films by in situ Ellipsometric, Spectral Reflectance and Transmittance Measurements, and Ion-Scattering Spectroscopy, Review of Scientific Instruments, vol. 56, p. 1955 (1985).

(List continued on next page.)

Primary Examiner—Bruce Y. Arnold
Assistant Examiner—Terry S. Callaghan
Attorney, Agent, or Firm—H. Fredrick Hamann; Craig O. Malin; John J. Deinken

[57] ABSTRACT

A method of fabricating an optical coating includes a layer pair, with a layer of a first optical material having a first refractive index and a first nominal thickness and a layer of a second optical material having a second refractive index and a second nominal thickness. The first layer is deposited, then its actual thickness is measured. A target thickness for the second layer is determined so that the optical properties of the combined actual first layer and target second layer are substantially the same as the optical properties of the combined nominal first layer and nominal second layer. The second layer is then deposited. Where the optical coating further includes a plurality of layer pairs, the steps of depositing, measuring, determining, and depositing are repeated for each of the layer pairs in the pairwise approach. Alternatively, in the layer-to-layer approach, for each layer pair after the initial layer pair the actual thickness of the second layer in the preceding layer pair is measured and a target thickness for the first layer is determined so that the optical properties of the combined actual preceding second layer and target first layer are substantially the same as the optical properties of the combined nominal preceding second layer and nominal first layer. The first layer is then deposited and its actual thickness measured. A target thickness for the second layer is determined so that the optical properties of the combined actual first layer and target second layer are substantially the same as the optical properties of the combined nominal first layer and nominal second layer, then the second layer is deposited.

6 Claims, 2 Drawing Sheets

OTHER PUBLICATIONS

Snedaker, New Numerical Thin-Film Synthesis Technique, Journal of the Optical Society of America, vol. 72, p. 1732 (1982).

Southwell, Coating Design Using Very Thin High- and Low-Index Layers, Applied Optics, vol. 24, p. 457 (1985).

Southwell, Gradient-Index Antireflection Coatings, Optics Letters, Vol. 8, p. 584 (Nov. 1983).

Theeten, Ellipsometric Assessment of (Ga,Al) As/GaAs Epitaxial Layers During their Growth in an Organometallic VPE System, Journal of Crystal Growth, vol. 46, p. 245 (1979).

Yadava, et al., Optical Behavior of Gradient-Index Multilayer Films, Thin Solid Films, Vol. 21, p. 297 (1974).

4,778,251

THICKNESS ERROR COMPENSATION FOR DIGITAL GRADIENT-INDEX OPTICAL COATINGS

GOVERNMENT RIGHTS

The United States Government has rights in this invention pursuant to a contract awarded by the United States Air Force.

BACKGROUND OF THE INVENTION

This invention is concerned with the deposition of multiple-layer optical coatings, and in particular with compensating for thickness errors which are made during the deposition process for ultrathin films.

The design of optical coatings consisting of multiple ultrathin films has advanced greatly in recent years. Any arbitrary gradient-index interference coating has an equivalent sequence of ultrathin high- or low-index layers, referred to as a digital configuration, for all wavelengths. Such digital configurations can be derived directly from arbitrary index profiles by using a prescribed two-layer high-low equivalent for each thin layer of arbitrary index. Digital configurations may be designed directly from given spectral requirements by using a so-called flip-flop optimization scheme which has been described in Southwell, Coating Design Using Very Thin High- and Low-Index Layers, Applied Optics, Volume 24, Page 457 (1985).

It is thus possible to design a multiple-layer interference coating for obtaining any arbitrary transmission or reflection spectrum that may be desired for an application. This has led to the development of a large number of new optical devices making use of complex spectral filter structures. Antireflection coatings, laser dielectric mirrors, television camera edge filters, optical bandpass filters, and band-rejection filters are some of the examples of useful devices employing thin-film interference coatings.

U.S. Pat. No. 4,583,822 to Southwell discloses an antireflective optical film which exhibits a quintic refractive index profile with an initial refractive index as close as possible to the refractive index of the incident medium and a final refractive index substantially equal to the refractive index of the substrate. It is further disclosed that the film may be also fabricated as a plurality of layers, with each layer substantially thinner than wavelengths within the spectral band. Each layer within the profile is divided into a sublayer pair, including a first sublayer with the refractive index $n_L$ and a second sublayer with the refractive index $n_H$, such that the refractive index of each sublayer pair approximates the average refractive index of the corresponding layer as defined by the quintic profile.

The practical realization of complex ultrathin-film structures necessitated advances in the technology of ultrathin film fabrication. One such advancement, for example, was the development of a means for monitoring both the refractive index and the thickness of ultrathin film layers during the deposition process, as described in the pending U.S. patent application Ser. No. 06/834,689 by Randolph L. Hall and William H. Southwell entitled "Ellipsometric Thin Film Monitor." Prior to the development of ellipsometric monitoring techniques, there was no way to measure the thickness of ultrathin optical layers during the deposition process, since previous monitoring devices were limited to the measurement of films to within at best 1/10th the wavelength of light (of the order of several hundred Angstroms).

Slight errors in thickness during the deposition procedure can introduce phase shifts that significantly degrade the performance of an interference coating as a spectral filter. Errors in the index of refraction within a deposition cycle add additional frequency components to the profile which leads to the growth of unwanted sidebands. It would be an important advance in the technology of multilayer optical coating deposition if there were some way to reduce the effects of errors in thickness made during deposition of the films of the coating.

SUMMARY OF THE INVENTION

The present invention provides a method of compensating for thickness errors in the deposition of multiple ultrathin-film digital equivalent gradient-index optical coatings.

A method of fabricating an optical coating which includes a layer pair, with a layer of a first optical material having a first refractive index and a first nominal thickness and a layer of a second optical material having a second refractive index and a second nominal thickness, involves the steps of depositing the first layer and measuring the actual thickness of the first layer. A target thickness is then determined for the second layer such that the optical properties of the combined actual first layer and target second layer are substantially the same as the optical properties of the combined nominal first layer and nominal second layer, then the second layer is deposited.

Where the optical coating includes a plurality of layer pairs, each with a layer of the first optical material having the first refractive index and a first nominal thickness and a layer of the second optical material having the second refractive index and a second nominal thickness, one alternative is to repeat the steps of depositing, measuring, determining, and depositing for each of the layer pairs.

A second alternative is to, for each layer pair after the initial layer pair, measure the actual thickness of the second layer in the preceding layer pair and determine a target thickness for the first layer such that the optical properties of the combined actual preceding second layer and target first layer are substantially the same as the optical properties of the combined nominal preceding second layer and nominal first layer. The first layer is then deposited and its actual thickness is measured. A target thickness for the second layer is determined such that the optical properties of the combined actual first layer and target second layer are substantially the same as the optical properties of the combined nominal first layer and nominal second layer and the second layer is deposited.

In a more particular embodiment, the method involves fabricating the digital equivalent of a portion of a gradient-index optical coating which includes a layer pair, with a layer of a first optical material having a refractive index $n_1$ and a nominal thickness $t_1$ and a layer of a second optical material having a refractive index $n_2$ and a nominal thickness $t_2$. The layer pair replaces a portion of the gradient-index coating having a thickness $T$, a refractive index $\bar{n}$ at the center of the portion and a gradient of refractive index $\bar{g}$ at the center of the portion. The first layer is deposited and its actual thickness $t_1'$ is measured to determine the deviation of the actual thickness from the nominal thickness. A target value of thickness $t_2'$ is determined for the second layer so that $$t_2' = t_2 + (t_1' - t_1) \frac{\bar{n}^2 (1 + (\bar{g}T/\bar{n})) - n_1^2}{n_2^2 - \bar{n}^2 (1 + (\bar{g}T/\bar{n}))},$$

then the second layer is deposited.

Where the digital equivalent coating includes a plurality of layer pairs, each with a layer of the first optical material having the refractive index $n_1$ and a nominal thickness $t_1$ and a layer of the second optical material having the refractive index $n_2$ and a nominal thickness $t_2$, one alternative is to repeat the steps of depositing, measuring, determining, and depositing for each of the layer pairs.

A second alternative involves the steps of, for each layer pair after the initial layer pair, measuring the actual thickness $t_2''$ of the second layer in the preceding layer pair and determining a target thickness $t_1''$ for the first layer such that $$t_1'' = t_1 + (t_2'' - t_2) \frac{\bar{n}^2 (1 + (\bar{g}T/\bar{n})) - n_2^2}{n_1^2 - \bar{n}^2 (1 + (\bar{g}T/\bar{n}))}$$

where T is the thickness of the portion of the gradient index replaced by the second layer in the preceding layer pair and the first layer, $\bar{n}$ is the refractive index at the center of the portion, and $\bar{g}$ is the gradient of refractive index at the center of the portion. The first layer is then deposited and the actual thickness $t_1'$ of the first layer is measured. A target thickness $t_2'$ for the second layer is determined such that $$t_2' = t_2 + (t_1' - t_1) \frac{\bar{n}^2(1 + (\bar{g}T/\bar{n})) - n_1^2}{n_2^2 - \bar{n}^2(1 + (\bar{g}T/\bar{n}))}$$

where T is the thickness of the portion of the gradient index replaced by the first layer and the second layer, $\bar{n}$ is the refractive index at the center of the portion, and $\bar{g}$ is the gradient of refractive index at the center of the portion, and the second layer is deposited.

The invention also includes an optical coating, including a layer pair with a layer of a first optical material having a first refractive index and a first nominal thickness and a layer of a second optical material having a second refractive index and a second nominal thickness, in which the first layer is deposited with a first actual thickness and the second layer is deposited on the first layer with a target thickness such that the optical properties of the combined actual first layer and target second layer are substantially the same as the optical properties of the combined nominal first layer and nominal second layer.

DESCRIPTION OF THE DRAWINGS

Additional details of the invention are described below in conjunction with the drawings, in which the same numerals are used throughout to refer to like elements in all the figures. In the drawings.

DESCRIPTION OF THE INVENTION

Figure 1:
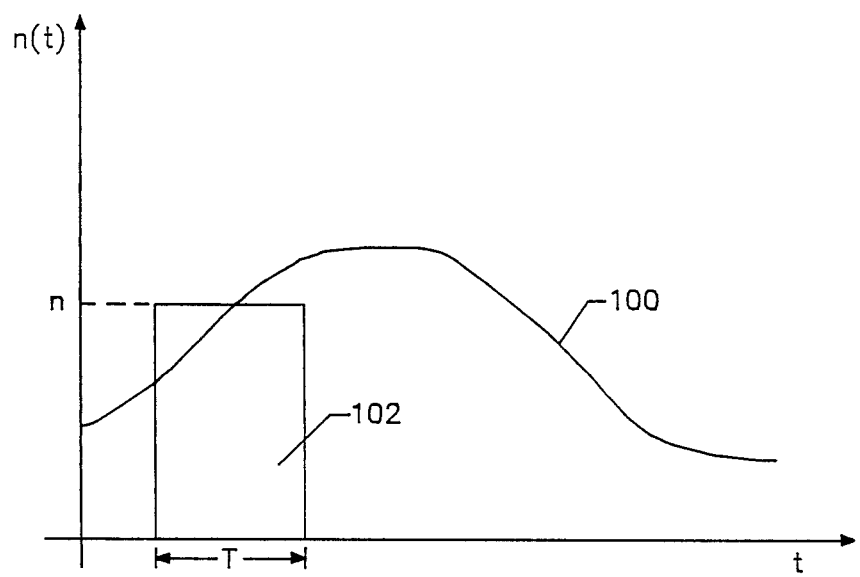
FIG. 1 is a plot of thickness versus refractive index which shows how a gradient-index distribution can be represented by a series of ultrathin, uniform layers.
Figure 2:
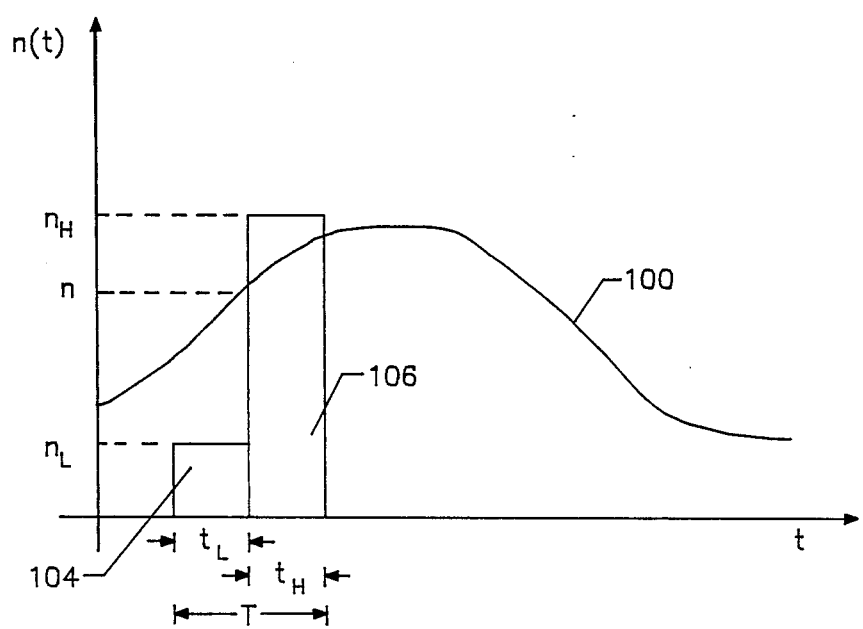
FIG. 2 is the same plot as given in FIG. 1, but showing how the layer shown in FIG. 1 is equivalent to a high-index/low-index pair of layers with two different calculated thicknesses.

In general a gradient-index distribution is characterized by a function n(t) as indicated by the curve 100 in FIG. 1, which is a plot of thickness t on the horizontal axis versus refractive index n(t) on the vertical axis showing the variation of refractive index with depth for a portion of a hypothetical optical coating. The digital ultrathin-film equivalence concept allows a coating with the equivalent of this gradient-index profile to be fabricated using materials with specific indices of refraction. In this approach, the theoretical coating with a gradient-index profile is first quantized into thin discrete layers. This quantization is shown in FIG. 1 for one discrete layer 102, which has a thickness T and a refractive index $\bar{n}$ at the center of thickness of the layer. The value $\bar{n}$ is assumed to be the effective value of refractive index over the entire interval of the gradient-index profile represented by the layer 102. That is, $$\bar{n} = n(T/2) \tag{1}$$

where the parenthetical expression indicates that the function n is evaluated at the point T/2. (As those skilled in the art will appreciate, the horizontal scale of thickness is greatly exaggerated relative to the vertical scale of refractive index for the purpose of facilitating this explanation of the thin-film equivalence technique). Each layer is then further divided into an equivalent high-index/low-index pair, with a first layer of a material having a relatively low index of refraction and a second layer of a material having a higher index of refraction. This subdivision is shown in FIG. 2, where the layer 102 is replaced by a low index layer 104, with a thickness $t_L$ and a refractive index $n_L$, and a high index layer 106, with a thickness $t_H$ and a refractive index $n_H$.

The thin layer equivalence principle (see Southwell, Coating Design Using Very Thin High- and Low-Index Layers, Applied Optics, Volume 24, Page 457 (1985)), specifies the thickness $t_L$ of the low-index material as $$t_L = \frac{(\bar{n}^2 - n_H^2)}{(n_L^2 - n_H^2)} T \tag{2}$$

and the thickness $t_H$ of the high-index layer $$t_H = T - t_L. \tag{3}$$

It is an outstanding feature of this invention to provide a technique for correcting the thin film equivalent layers to compensate for errors in the fabrication of the layers. Suppose that in the deposition process the target thickness for the low-index layer has been overshot and incremental monitoring indicates that a thickness $t_L'$ has actually been deposited. That is, because of a thickness error e the actual thickness is $$t_L' = t_L + e \tag{4}$$

This deviation may be compensated for by adjusting the thickness of the next layer, i.e., by calculating a new target thickness $t_H'$ $$t_H' = t_H + d \tag{5}$$

for the next layer, where d is the prescribed compensation for the error e. The precise way to determine d is to find a $t_H'$ which together with $t_L'$ yields a new refractive index $\bar{n}'$, where the sum of $t_L'$ and $t_H'$ is the new total thickness of the layer pair. At the center of the new thickness interval, the new value $\bar{n}'$ of the refractive index will be $$n' = n((t_L' + t_H')/2) \tag{6}$$

which is consistent with the thin film equivalence relation $$n'^2(t_L' + t_H') = n_L^2 t_L' + n_H^2 t_H' \tag{7}$$

Equation (7) determines $t_H'$, but because $t_H'$ is embedded as an argument of the index function (Equation (6)), Equation (7) is an implicit equation, which implies an iterative solution. It can be solved exactly, however, if it is assumed that e is small compared to T. By that assumption the compensation d should also be small. A Taylor series expansion may be performed on the index function $\bar{n}'$ about $\bar{n}$ as the base point. With these assumptions, Equation (6) becomes $$n((t_L' + t_H')/2) = n(T/2 + (e+d)/2) \tag{8}$$

where the outer parentheses imply functional dependence rather than multiplication.

A Taylor series expansion yields $$n' = n + g((e+d)/2) + \ldots \tag{9}$$

where $g = dn/dt$ is the index gradient evaluated at the middle of the interval $(t = T/2)$.

Using Equations (4), (5), and (9), Equation (7) becomes $$n + (g/2)(e+d)^2 T + (e+d) = = n_L^2 (t_L + e) + n_H^2 (t_H + d) \tag{10}$$

The dominant terms subtract from both sides due to the relation $$n = n_L^2 t_L + n_H^2 t_H \tag{11}$$

which was used to determine $t_L$ and $t_H$. This leaves the first-order small quantities $$n^2(1 + gT/n)(e+d) = n_L^2 e + n_H^2 d \tag{12}$$

which may be readily solved for d:

$$d = \frac{n^2((1 + gT/n) - n_L^2}{n_H^2 - n^2(1 + (gT/n))} \cdot e \tag{13}$$

Note that the thickness correction d for the second layer in the layer pair is proportional to the measured error e in the first layer. Furthermore, the proportionality constant may be calculated even before deposition begins on the first layer, which facilitates the implementation of the correction technique of this invention in real time during the deposition of the thin film layers.

The selection of the thickness T for the equivalent layers is not critical, so long as it is small enough for the thin-layer equivalence (Equation (11)) to be valid. This is true if $$T < \lambda/40 \, n_{av} \tag{14}$$

where $n_{av}$ is an average of the refractive index for the entire gradient layer film being considered and $\lambda$ is a representative wavelength of light for the film.

Figure 3:
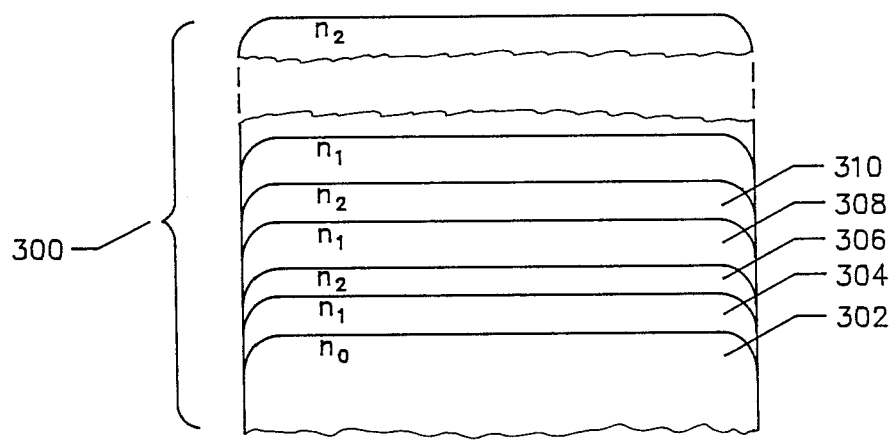
FIG. 3 is a schematic drawing of the first few layers deposited in a multiple-layer ultrathin-film digital equivalent of a gradient-index film.

The methods of the present invention may be conveniently described by referring to FIG. 3. FIG. 3 is a schematic drawing of part of a multiple-layer ultrathin-film coating made according to one of the methods of the present invention. The coating 300 is fabricated by the alternate deposition of two different materials having refractive indices $n_1$ and $n_2$. Typically the deposition is carried out by heating the source materials in a vacuum chamber containing the surface to be coated. The heating increases the vapor pressure of the source materials, and if the vacuum chamber pressure is sufficiently low that the molecular mean free path is greater than the source-to-target distance, the source materials will be deposited on the target surface. Either source can be mechanically blocked from the view of the target, while the heating of the source material, the choice of source material, and the duration of vapor deposition can be controlled automatically. Through the use of an ellipsometer, the present state of the art permits the deposition of ultrathin layers on the order of 100 Angstroms whose thickness can be measured to within a few Angstrom units (1 Angstrom = $10^{-8}$ centimeter). The thickness of such an ultrathin film is required by the thin film equivalence principle referred to above to be much less than the average wavelength of light in the spectral region of the filter being fabricated. A typical wavelength of light in the visible region of the electromagnetic spectrum will be several thousand Angstroms. Ellipsometer measurements typically take only a few seconds, and the entire film deposition process can be controlled by computer.

A first layer 304 of material of refractive index $n_1$ is deposited on a substrate material 302 having refractive index $n_0$. The intended thickness of the first layer 304 is $t_1$, the nominal thickness value calculated according to theory. Because of inaccuracies in the deposition process, however, the actual thickness of the first layer 304 is measured to be $t_1'$. To compensate for this thickness error, the target thickness of the second layer is recalculated, using Equations (5) and (13), so that it is different from the value initially predicted by the theory of high-index/low-index ultrathin layer pair equivalents on the assumption that the first layer had a thickness $t_1$. The target thickness for the second layer is corrected so that the optical properties of the combined actual first layer 304 and the target second layer will be substantially the same as the optical properties of the combined nominal first layer and nominal second layer. The second layer 306 of material with refractive index $n_2$ is then deposited with a thickness as close to its recalculated target thickness as possible. The combined thickness T' of the first two layers 304 and 306 will be different than the thickness T originally prescribed by theory, but the effective refractive index $\bar{n}'$ for this layer pair still lies on the specified gradient-index curve.

At this point in the deposition process there are two different methods of proceeding to deposit multiple layers. In the first approach, the deviation in the thickness of the deposited second layer 306 is measured and used to recalculate the desired thickness of the third layer 308, such that the optical properties of the combined actual second layer and target third layer are substantially the same as the predicted optical properties of the combined nominal second layer and nominal third layer. The third layer 308 is deposited with the new target thickness, then the desired thickness of the fourth layer 310 is recalculated using the deviation in the deposited third layer, and so on until all the layers in the coating have been deposited. With this layer-to-layer approach, all the layers except the last are compensated for deposition thickness errors.

More specifically, this first approach involves, for each layer pair after the initial layer pair, measuring the actual thickness $t_2''$ of the second layer in the preceding layer pair, then determining a target thickness $t_1''$ for the first layer such that $$t_1'' = t_1 + (t_2'' - t_2)\frac{n^2(1 + (gT/n)) - n_2^2}{n_1^2 - n^2(1 + (gT/n))}$$

where T is the thickness of the portion of the gradient index replaced by the second layer in the preceding layer pair and the first layer, $\bar{n}$ is the refractive index at the center of the portion, and $\bar{g}$ is the gradient of refractive index at the center of the portion. The first layer is deposited and its actual thickness $t_1'$ measured. A target thickness $t_2'$ for the second layer is then determined such that $$t_2' = t_2 + (t_1' - t_1)\frac{n^2(1 + (gT/n)) - n_1^2}{n_2^2 - n^2(1 + (gT/n))}$$

where T is now the thickness of the portion of the gradient index replaced by the first layer and the second layer, $\bar{n}$ is the refractive index at the center of this portion, and $\bar{g}$ is the gradient of refractive index at the center of the portion. The second layer is then deposited and the process is repeated for each succeeding layer pair in the coating.

Alternatively, the originally calculated thickness of the third layer 308 is deposited, then the error in deposition thickness is measured and used to recalculate the thickness of the fourth layer 310. This process is repeated for each succeeding layer pair until all the layers in the coating are deposited. In this pair-wise technique the result is a coating of many layer pairs, with the second layer in each layer pair compensated for the thickness error in depositing the first layer.

In the more particular embodiment, the pair-wise approach involves determining a target value of thickness $t_2'$ for the second layer in each pair where $$t_2' = t_2 + (t_1' - t_1)\frac{n^2(1 + (gT/n)) - n_1^2}{n_2^2 - n^2(1 + (gT/n))}$$

and T is the thickness of the portion of the coating represented by the layer pair, $\bar{n}$ is the refractive index at the center of the portion, and $\bar{g}$ is the gradient of refractive index at the center of the portion.

The layer-to-layer method described above gives very good results when there is poor control over the deposition thickness of both materials. The material over which there is less control is deposited first, in that case. The pairwise method is more appropriate when good deposition control can be achieved over one of the two materials being deposited.

Suppose, for example, that the two materials selected each exhibit an average thickness error of 10% when deposited. Using the layer-to-layer thickness error compensation method of the present invention would result in an overall thickness error of only 5%. On the other hand, consider the case where the average thickness error for one material is 10% and the other material can be deposited without error. Using the pairwise compensation method of the present invention, a precise multiple-layer optical coating can be produced, despite the imprecision in the deposition of one of the two materials.

The present invention also encompasses a new type of multiple-layer ultrathin-film digital equivalent optical coating which can be precisely and unambiguously described in terms of the thickness of each individual layer in the coating, the total thickness of the coating, the effective refractive index of any two adjacent layers in the film, and the overall spectral response of the coating.

The method of this invention is not dependent on the periodicity of the index function n(t). Therefore the method is useful for multiple line filters, quintic type antireflection gradient-index coatings, and other arbitrary index profiles.

The present invention has been described in detail with reference to particular preferred embodiments, but persons possessing ordinary skill in the art to which this invention pertains will appreciate that various modifications may be made without departing from the spirit and scope of the invention.

The teaching of the following documents, which are referred to herein, is incorporated by reference: Southwell, U.S. Pat. No. 4,583,822; Southwell, Coating Design Using Very Thin High- and Low-Index Layers, Applied Optics, Volume 24, Page 457 (1985); Southwell, Gradient-Index Antireflection Coatings, Optics Letters, Volume 8, Page 584 (1983).

We claim:

1. An optical coating which is the digital equivalent of a portion of a gradient-index optical coating having a thickness T, a refractive index $\bar{n}$ at the center of the portion, and a gradient of refractive index $\bar{g}$ at the center of the portion, the digital equivalent coating including a layer pair, with a layer of a first optical material having a refractive index $n_1$ and a nominal thickness $t_1$ and a layer of a second optical material having a refractive index $n_2$ and a nominal thickness $t_2$, the coating being made by the method of:

depositing the first layer;
measuring the actual thickness $t_1'$ of the first layer to determine the deviation of the actual thickness from the nominal thickness;
determining a target value of thickness $t_2'$ for the second layer where $$t_2' = t_2 + (t_1' - t_1)\frac{n^2(1 + (gT/n)) - n_1^2}{n_2^2 - n^2(1 + (gT/n))}$$

and
depositing the second layer.

2. The coating of claim 1, wherein the digital equivalent coating includes a plurality of layer pairs, each with a layer of the first optical material having the refractive index $n_1$ and a nominal thickness $t_1$ and a layer of a second optical material having the refractive index $n_2$ and a nominal thickness $t_2$, further comprising the step of:

repeating the steps of depositing, measuring, determining, and depositing for each of the layer pairs.

3. The coating of claim 1 where the digital equivalent coating includes a plurality of layer pairs, each with a layer of the first optical material having the refractive index $n_1$ and a nominal thickness $t_1$ and a layer of the second optical material having the refractive index $n_2$ and a nominal thickness $t_2$, further comprisng the steps of, for each layer pair after the initial layer pair:

measuring the actual thickness $t_2''$ of the second layer in the preceding layer pair;

determining a target thickness $t_1''$ for the first layer such that $$t_1'' = t_1 + (t_2'' - t_2) \frac{n^2(1 + (gT/n)) - n_2^2}{n_1^2 - n^2(1 + (gT/n))}$$

where T is the thickness of the portion of the gradient index replaced by the second layer in the preceding layer pair and the first layer, $\bar{n}$ is the refractive index at the center of the portion, and $\bar{g}$ is the gradient of refractive index at the center of the portion;

depositing the first layer;

measuring the actual thickness $t_1'$ of the first layer;

determining a target thickness $t_2'$ for the second layer such $$t_2' = t_2 + (t_1' - t_1) \frac{n^2(1 + (gT/n)) - n_1^2}{n_2^2 - n^2(1 + (gT/n))}$$

where T is the thickness of the portion of the gradient index replaced by the first layer and the second layer, $\bar{n}$ is the refractive index at the center of the portion, and $\bar{g}$ is the gradient of refractive index at the center of the portion; and depositing the second layer.

4. A method of fabricating the digital equivalent of a portion of a gradient-index optical coating having a thickness T, a refractive index $\bar{n}$ at the center of the portion, and a gradient of refractive index $\bar{g}$ at the center of the portion, the digital equivalent coating incldu ing a layer pair, with a layer of a first optical material having a refractive index $n_1$ and a nominal thickness $t_1$ and a layer of a second optical material having a refractive index $n_2$ and a nominal thickness $t_2$, comprising the steps of:

depositing the first layer;

measuring the actual thickness $t_1'$ of the first layer to determine the deviation of the actual thickness from the nominal thickness;

determining a target value of thickness $t_2'$ for the second layer where $$t_2' = t_2 + (t_1' - t_1) \frac{n^2(1 + (gT/n)) - n_1^2}{n_2^2 - n^2(1 + (gT/n))}$$

and depositing the second layer.

5. The method of claim 4, wherein the digital equivalent coating includes a plurality of layer pairs, each with a layer of the first optical material having the refractive index $n_1$ and a nominal thickness $t_1$ and a layer of the second optical material having the refractive index $n_2$ and a nominal thickness $t_2$, further comprising the step of:

repeating the steps of depositing, measuring, determining, and depositing for each of the layer pairs.

6. The method of claim 4 where the digital equivalent coating includes a plurality of layer pairs, each with a layer of the first optical material having the refractive index $n_1$ and an nominal thickness $t_1$ and a layer of the second optical material having the refractive index $n_2$ and a nominal thickness $t_2$, further comprising the steps of, for each layer pair after the initial layer pair;

measuring the actual thickness $t_2''$ of the second layer in the preceding layer pair;

determining a target thickness $t_1''$ for the first layer such that $$t_1'' = t_1 + (t_2'' - t_2) \frac{n^2(1 + (gT/n)) - n_2^2}{n_1^2 - n^2(1 + (gT/n))}$$

where T is the thickness of the portion of the gradient index replaced by the second layer in the preceding layer pair and the first layer, n is the refractive index at the center of the portion, and g is the gradient of refractive index at the center of the portion;

depositing the first layer;

measuring the actual thickness $t_1'$ of the first layer;

determining a target thickness $t_2'$ for the second layer such that $$t_2' = t_2 + (t_1' - t_1) \frac{n^2(1 + (gT/n)) - n_1^2}{n_2^2 - n^2(1 + (gT/n))}$$

where T is the thickness of the portion of the gradient index replaced by the firt layer and the second layer, $\bar{n}$ is the refractive index at the center of the portion, and $\bar{g}$ is the gradient of refractive index at the center of the portion; and depositing the second layer.

* * * * *